United States Patent
Yu et al.

(10) Patent No.: US 10,053,011 B2
(45) Date of Patent: Aug. 21, 2018

(54) DRIVING DEVICE OF ELECTRIC FOLDING TYPE SIDE VIEW MIRROR FOR A VEHICLE

(71) Applicant: SMR Patents S.A.R.L., Luxembourg (LU)

(72) Inventors: Il-Sung Yu, Incheon (KR); Dong Myeong Park, Bocheon-si (KR)

(73) Assignee: SMR PATENT S.A.R.L., Luxembourg (LU)

( * ) Notice: Subject to any disclaimer, the term of this patent is extended or adjusted under 35 U.S.C. 154(b) by 232 days.

(21) Appl. No.: 14/905,906

(22) PCT Filed: Jul. 16, 2014

(86) PCT No.: PCT/IB2014/063149
§ 371 (c)(1),
(2) Date: Jan. 18, 2016

(87) PCT Pub. No.: WO2015/008235
PCT Pub. Date: Jan. 22, 2015

(65) Prior Publication Data
US 2016/0152186 A1    Jun. 2, 2016

(30) Foreign Application Priority Data
Jul. 16, 2013  (KR) .................. 10-2013-0083843

(51) Int. Cl.
*B60R 1/07* (2006.01)
*B60R 1/074* (2006.01)
(Continued)

(52) U.S. Cl.
CPC ............... *B60R 1/07* (2013.01); *B60R 1/074* (2013.01); *H02K 5/04* (2013.01); *H02K 7/1166* (2013.01)

(58) Field of Classification Search
CPC .... H02K 7/081; H02K 7/1166; H02K 5/1672; H02K 5/1732; H02K 2205/03; H02K 2213/09
See application file for complete search history.

(56) References Cited

U.S. PATENT DOCUMENTS 5,169,245 A * 12/1992 Harada .................. F16C 17/08
384/218
6,269,709 B1 * 8/2001 Sangret .................. F16C 23/10
74/398
(Continued)

FOREIGN PATENT DOCUMENTS

DE    102007038916 A1    2/2009
EP       1637769 A1    3/2006
(Continued)

OTHER PUBLICATIONS

Korean Notice of Preliminary Rejection, Application No. 10-2013-0083843, dated Jul. 7, 2014.
(Continued)

*Primary Examiner* — Dang Le
(74) *Attorney, Agent, or Firm* — MacMillan, Sobanski & Todd, LLC

(57) ABSTRACT

The present invention relates to a driving device of an electric folding type side view mirror for a vehicle, comprising: an upper case (30) in which a motor seating part is formed; an electric motor (40), installed inside the upper case (30), for generating rotation power; a worm gear (11) installed at a rotational axis (14) of the electric motor (40); a worm wheel gear (12), connected to the worm gear (11), for transferring the rotation power; a lower case (20) formed with fixing means (21, 22); a cap spring (14) fixed to the lower case (20) by the fixing means (21, 22) and a cap (13),
(Continued)

mounted at a top of the cap spring (14), for receiving a lower end of the rotational axis (14).

5 Claims, 5 Drawing Sheets

(51) Int. Cl.
*H02K 7/116* (2006.01)
*H02K 5/04* (2006.01)

(56) References Cited

U.S. PATENT DOCUMENTS

| | | | | |
|---|---|---|---|---|
| 7,493,986 B2 * | 2/2009 | Kim | ............... | B62D 5/0409 |
| | | | | 180/428 |
| 7,800,265 B2 * | 9/2010 | Nishikawa | ............ | B62D 5/0403 |
| | | | | 310/90 |
| 8,001,866 B2 * | 8/2011 | Song | ............... | B62D 5/0409 |
| | | | | 74/388 PS |
| 8,443,929 B2 * | 5/2013 | Suzuki | ............... | B62D 5/0409 |
| | | | | 180/444 |
| 2005/0128612 A1 | 6/2005 | Ro | | |
| 2010/0206111 A1 | 8/2010 | Keller et al. | | |
| 2011/0069406 A1 | 3/2011 | Hwang et al. | | |

FOREIGN PATENT DOCUMENTS

| | | |
|---|---|---|
| EP | 2301804 B1 | 12/2011 |
| KR | 1020050060207 | 6/2005 |
| KR | 100543643 B1 | 1/2006 |
| KR | 1020110033016 | 3/2011 |
| WO | 2015008235 A1 | 1/2015 |

OTHER PUBLICATIONS

PCT International Search Report and Written Opinion, Application No. PCT/IB2014/063149, dated Oct. 10, 2014.

* cited by examiner

DRIVING DEVICE OF ELECTRIC FOLDING TYPE SIDE VIEW MIRROR FOR A VEHICLE

CROSS REFERENCE TO RELATED APPLICATIONS

This application is the National Phase of International Application PCT/IB2014/063149 filed Jul. 16, 2014 which designated the U.S. and that International Application was published in English under PCT Article 21(2) on Jan. 22, 2015 as International Publication Number WO 2015/008235A1. PCT/IB2014/063149 claims priority to Korean Patent Application No. 10-2013-0083843, filed Jul. 16, 2013. The disclosures of both applications are incorporated herein by reference.

BACKGROUND OF THE INVENTION

1. Technical Field

The invention relates to a driving device of an electric folding type side view mirror for a vehicle, and, more particularly, to a driving device of an electric folding type side view mirror for a vehicle that does not cause thrust sounds when using a rotational axis of a motor as a buffer means.

2. Background Art

Side view mirrors play very important roles for safe driving so that a driver may grasp situations around a vehicle when driving the vehicle.

However, the side view mirror is protruded at a front left and right side of the vehicle and therefore there is a possibility that minor accidents may occur due to the side view mirror when parking the vehicle in a confined space or intersecting the vehicle on a narrow road.

In order to solve this problem, an electric folding type side view mirror that may conveniently be folded and unfolded by a driver at a driver's seat has been developed. The known electric folding type side view mirror controls a position of a back mirror using a driving device that transfers rotation power from an electric motor seated at an upper case using a worm wheel.

Korean Patent Registration No. 10-0543643, as an example of a prior art driving device of the electric folding type side view mirror for the vehicle, discloses a technology that may minimize generation of noises, although the rotational axis of the motor is not maintained vertically, by supporting the lower end of the rotational axis of the motor so as not to be interfered with, and that a motor body section fixed by a motor cap absorbs and buffers thrust using a back plate and spacer.

However, there is a problem in that this known technology still causes thrust sounds in the driving device of the electric folding type side view mirror for the vehicle described above.

SUMMARY OF THE INVENTION

An object of the invention is to provide a driving device of an electric folding type side view mirror for a vehicle substantially avoiding thrust sounds.

This object is achieved by providing a driving device of an electric folding type side view mirror for a vehicle comprising an upper case in which a motor seating part is formed; an electric motor, installed inside the upper case, for generating rotation power; a worm gear installed at a rotational axis of the electric motor; a worm wheel gear, connected to the worm gear, for transferring the rotation power; a lower case formed with a fixing means; a cap spring fixed to the lower case by the fixing means; and a cap, mounted at a top of the cap spring, for receiving a lower end of the rotational axis.

It is preferable that the lower end of the rotational axis of the electric motor extends beyond the upper case such that it can apply a pressing action to the cap and cap spring.

It is preferable that the center section on the top surface of the cap is formed with a hole for receiving the lower end of the rotational axis of the electric motor.

It is preferable that a plurality of bending sections for fixing the cap spring is disposed at the cap while forming circles.

It is preferable that the fixing means for fixing the cap spring in the lower case is formed with a boss, preferably having a saw-toothed wheel type outer peripheral surface onto which the cap spring is seated.

It is preferable that the fixing means for fixing the cap spring in the lower case is formed with a rib, preferably formed by two lines in order to be inserted with the cap spring.

Various aspects of this invention will become apparent to those skilled in the art from the following detailed description of the preferred embodiment, when read in light of the accompanying drawings.

DESCRIPTION OF THE PREFERRED EMBODIMENTS

Figure 1:
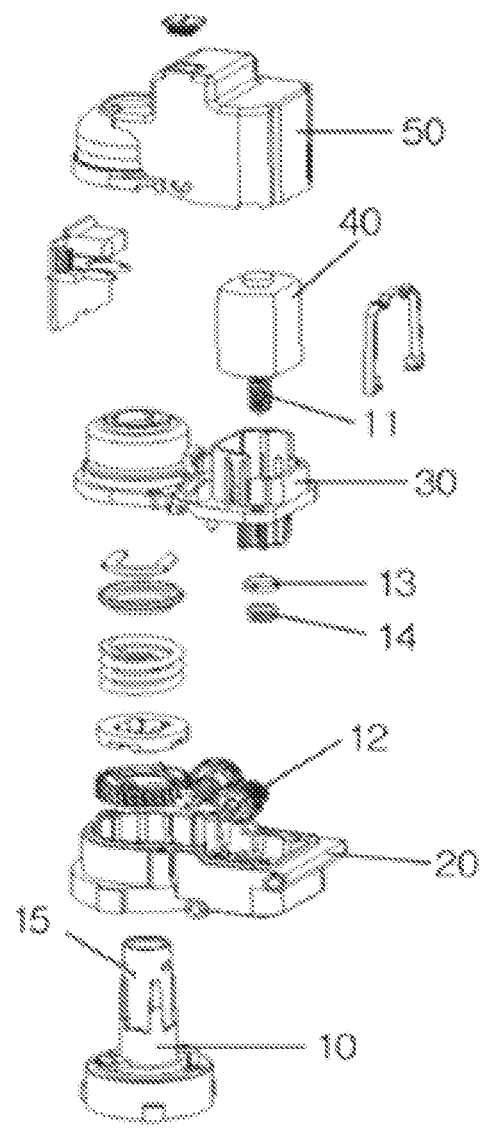
FIG. 1 is an entire exploded perspective view for a driving device of an electric folding type side view mirror for a vehicle according to a first embodiment of the invention.

Herein below, the preferred embodiments of the invention will be described with reference to the appended drawings to explain the invention in detail in such a manner that a person skilled in the art can easily carry out the invention. These and other objects, features and advantages of the invention will be apparent from the presently preferred embodiments.

Various modifications and changes may be made by those skilled in the art to which the invention pertains from this description. Therefore, the spirit of the invention should not be limited to the above-described embodiments, and the following claims, as well as all modifications and equivalents to the claims, are intended to fall within the scope and spirit of the invention.

It is noted that terms or words expressed in the specification and claims should not be limited to or construed by their conventional or dictionary meanings, but should be understood as meanings and concepts conforming with the technical spirits of the invention because the inventor can properly define the concepts of terms or words used in order to clarify the invention in the best manner. As an example, all terms relating to directions are defined on the basis of the positions illustrated in the drawings.

Figure 2:
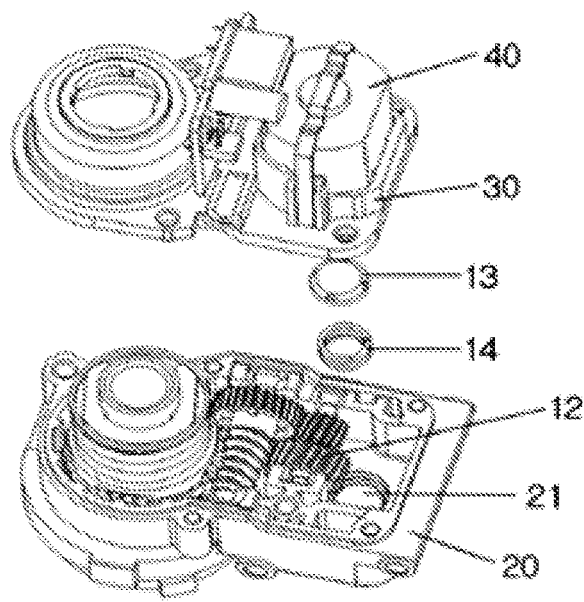
FIG. 2 is an exploded perspective view of an upper case and an lower case of the driving device of the electric folding type side view mirror for the vehicle according to the first embodiment of the invention.
Figure 3:
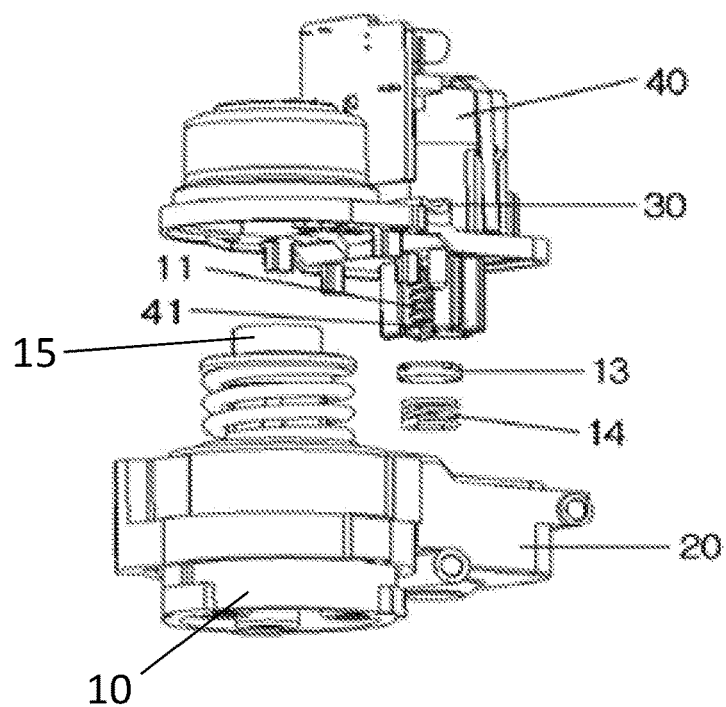
FIG. 3 is an exploded perspective view of an upper case and an lower case of the driving device of the electric folding type side view mirror for the vehicle according to the first embodiment of the invention.
Figure 4:
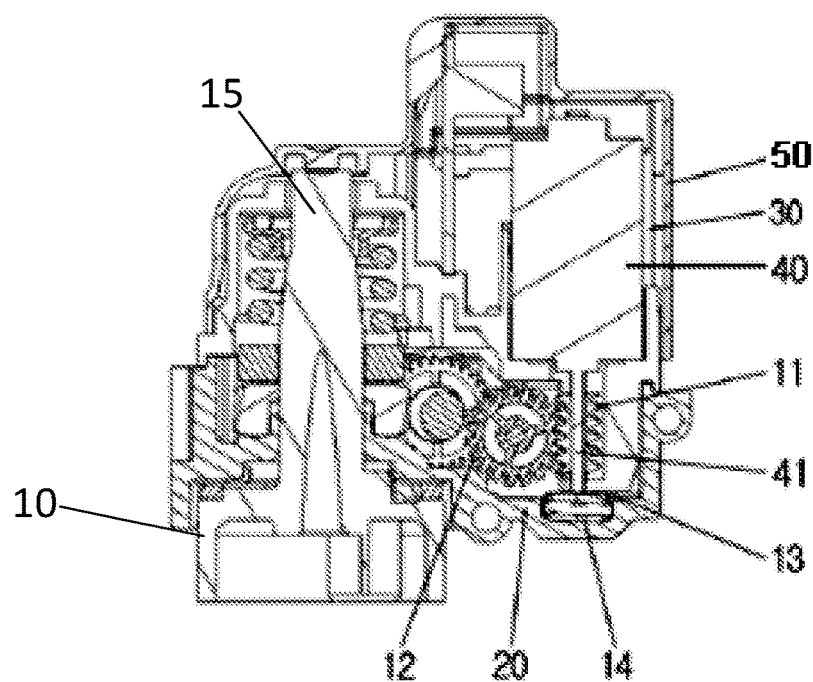
FIG. 4 is a cross-sectional view of the driving device of the electric folding type side view mirror for the vehicle according to the first embodiment of the invention.
Figure 5:
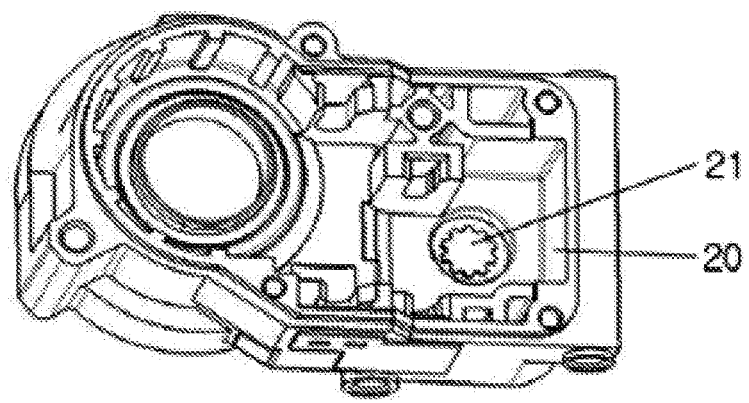
FIG. 5 is a perspective view of the lower case of the driving device of the electric folding type side view mirror for the vehicle according to the first embodiment of the invention.
Figure 6:
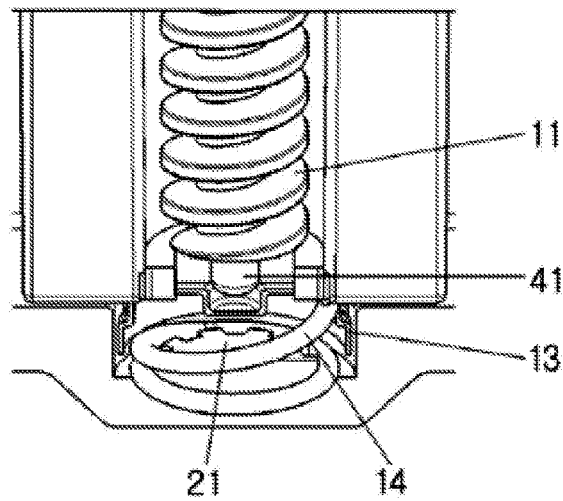
FIG. 6 is a partial cross-sectional view showing a section with a cap and spring of the driving device of the electric folding type side view mirror for the vehicle according to the first embodiment of the invention.
Figure 7:
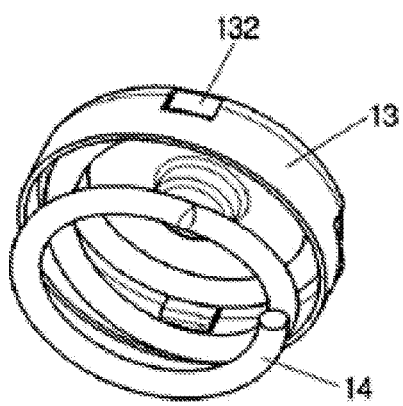
FIG. 7 is a perspective view of the cap and spring of the driving device of the electric folding type side view mirror for a vehicle according to the first embodiment of the invention.
Figure 8:
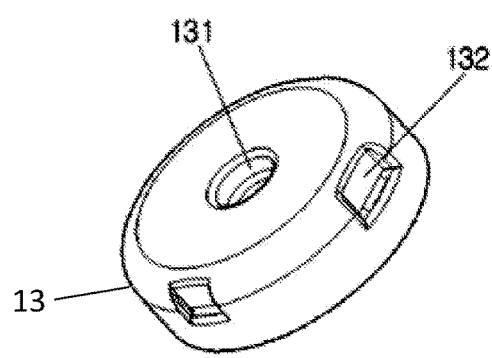
FIG. 8 is a perspective view of the cap of the driving device of the electric folding type side view mirror for the vehicle according to the first embodiment of the invention.

FIG. 1 is an entire exploded perspective view for a driving device of electric folding type side view mirror for a vehicle according to a first embodiment of the invention; FIG. 2 is an exploded perspective view of an upper case and a lower case of the driving device of the electric folding type side view mirror for the vehicle according to the first embodiment of the invention; FIG. 3 is an exploded perspective view of an upper case and a lower case of the driving device of the electric folding type side view mirror for the vehicle according to the first embodiment of the invention; FIG. 4 is a cross-sectional view of the driving device of the electric folding type side view mirror for the vehicle according to the first embodiment of the invention; FIG. 5 is a perspective view of the lower case of the driving device of the electric folding type side view mirror for the vehicle according to the first embodiment of the invention; FIG. 6 is a partial cross-sectional view showing a section disposing a cap and spring of the driving device of the electric folding type side view mirror for the vehicle according to the first embodiment of the invention; FIG. 7 is a perspective view of the cap and spring of the driving device of the electric folding type side view mirror for a vehicle according to the first embodiment of the invention; and FIG. 8 is a perspective view of the cap of the driving device of the electric folding type side view mirror for the vehicle according to the first embodiment of the invention.

As shown in FIG. 1 to FIG. 8, the driving device of electric folding type side view mirror for the vehicle according to a first embodiment of the invention comprises an upper case 30, in which a motor seating part is formed; an electric motor 40, disposed inside the upper case 30, for generating rotation power; a worm gear 11 disposed at a rotational axis 41 of the electric motor 40; a worm wheel gear 12, connected to the worm gear 11, for transferring rotation power; a lower case 20 with a base 10 formed with a boss 15 for fixing a spring; a cap spring 14 fixed to the boss 15 for fixing the spring; and a cap 13, mounted at a top of the cap spring 14, for receiving a lower end of the rotational axis 41.

The upper case 30 is coupled with the lower case 20, and a cover 50 is covers the outside of these components.

A lower end of the rotational axis 41 of the electric motor 40 is protruded to be longer than that of the upper case 30, and presses the cap 13 and cap spring 14, thereby preventing thrust sounds.

A center section on a top surface of the cap 13 is formed with a hole 131 for receiving the lower end of the rotational axis 41 of the electric motor 40, and four bending sections 132 for fixing the cap spring 14 are disposed distant by an interval of 90° while forming a circle. The cap spring 14 is formed with a compression coil spring.

The lower case 20 provides a recess for accommodating the cap 13 and the cap spring 14 with a fixing means for the cap spring 14 in form of a boss 21 on which the cap spring 14 is arranged.

An outer peripheral surface of the boss 21, for fixing the cap spring 14, of the lower case 20 is formed with a saw-toothed wheel type.

Figure 9:
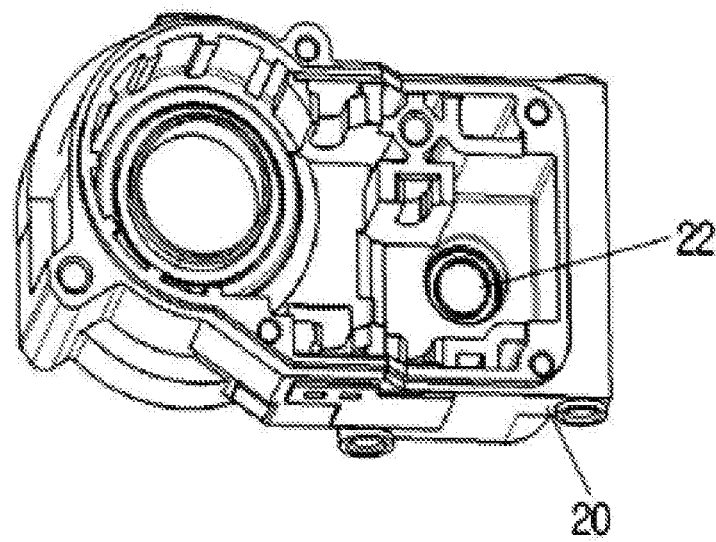
FIG. 9 is a perspective view of the lower case of the driving device of the electric folding type side view mirror for the vehicle according to a second embodiment of the invention.
Figure 10:
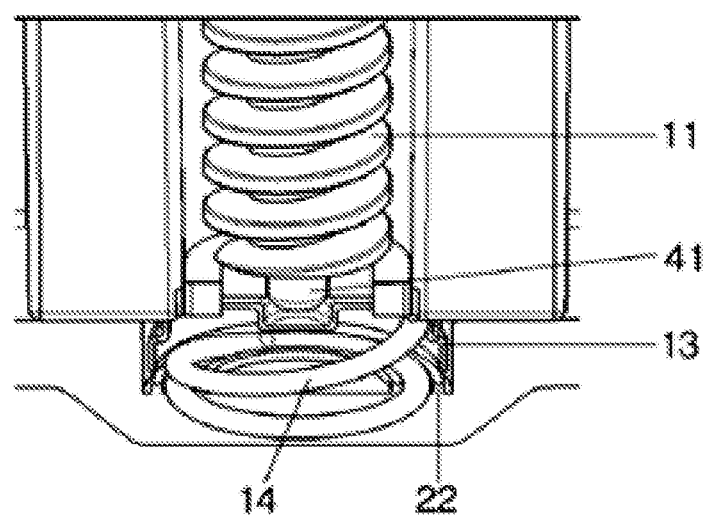
FIG. 10 is a partial cross-sectional view showing a section disposing the cap and spring of the driving device of the electric folding type side view mirror for the vehicle according to the second embodiment of the invention.

FIG. 9 is a perspective view of the lower case of the driving device of the electric folding type side view mirror for the vehicle according to a second embodiment of the invention, and FIG. 10 is a partial cross-sectional view showing a section disposing the cap and spring of the driving device of the electric folding type side view mirror for the vehicle according to the second embodiment of the invention.

As shown in FIG. 9 and FIG. 10, configurations of the driving device of electric folding type side view mirror for the vehicle according to a second embodiment of the invention are configured with the same structures as those of the first embodiment, except for the fact that a rib 22 for fixing the cap spring 14 is formed in the lower case 20.

The rib 22 for fixing the cap spring 14 in the lower case 20 is formed with the structure formed by two lines in order to insert the cap spring 14 into the rib 20.

With the configurations, the driving device of the electric folding type side view mirror for the vehicle according to an embodiment of the invention is operated, as follows.

On applying power to the electric motor 40, a rotation power is generated from the electric motor 40 to rotate the worm gear 11 such that the power is transferred to the side view mirror (not shown) through the worm wheel gear 12.

Like this, on rotating the worm wheel gear 12, engaged into the worm gear 11 and pushed into the rotational axis 41 of the electric motor 40, the rotational axis 41 of the electric motor 40 causes thrust vertically at an end play interval by a component force of the worm gear 11 so that the cap 13 and cap spring 14 are operated to absorb operation sounds caused by the thrust, thereby preventing thrust sounds. The upper end of the cap spring 14 is fixed into the bending section 132 of the cap 13, and the lower end of it is fixed into the boss 21 for fixing the spring or the rib 22 for fixing the spring in the lower case 20, thereby providing buffer power for absorbing operation sounds due to the thrust.

The principle and mode of operation of this invention have been explained and illustrated in its preferred embodiments. However, it must be understood that this invention may be practiced otherwise than as specifically explained and illustrated without departing from its spirit or scope.

The invention claimed is:

1. A driving device of an electric folding type side view mirror for a vehicle, comprising:
   an upper case in which a motor seating part is formed;
   an electric motor, installed inside the upper case, for generating rotation power;
   a worm gear installed at a rotational axis of the electric motor;

a worm wheel gear, connected to the worm gear, for transferring the rotation power; and a lower case formed with a fixing means;

a cap spring fixed to the lower case by the fixing means; the fixing means for fixing the cap spring in the lower case is formed with a boss, the boss having a saw-toothed outer peripheral surface onto which the cap spring is seated; and a cap is mounted at a top of the cap spring for receiving a lower end of the rotational axis.

2. The driving device of an electric folding type side view mirror for a vehicle according to claim 1, wherein the lower end of the rotational axis of the electric motor extends beyond the upper case such that it can apply a pressing action to the cap and the cap spring.

3. The driving device of an electric folding type side view mirror for a vehicle according to claim 1, wherein a center section of the top surface of the cap is formed with a hole for receiving the lower end of the rotational axis of the electric motor.

4. The driving device of an electric folding type side view mirror for a vehicle according to claim 1, wherein a plurality of bending sections for fixing the cap spring are disposed at the cap while forming a circle.

5. A driving device of an electric folding type side view mirror for a vehicle, comprising:

an upper case in which a motor seating part is formed;

an electric motor, installed inside the upper case, for generating rotation power;

a worm gear installed at a rotational axis of the electric motor;

a worm wheel gear, connected to the worm gear, for transferring the rotation power; and a lower case formed with a fixing means;

a cap spring fixed to the lower case by the fixing means;

the fixing means for fixing the cap spring in the lower case is formed with a rib, the rib being formed by two lines in order to insert the cap spring into the rib; and a cap is mounted at a top of the cap spring for receiving a lower end of the rotational axis.

* * * * *